Aug. 19, 1952     J. S. CHARIPAR     2,607,554
SUPPORT
Filed Feb. 13, 1947     2 SHEETS—SHEET 1
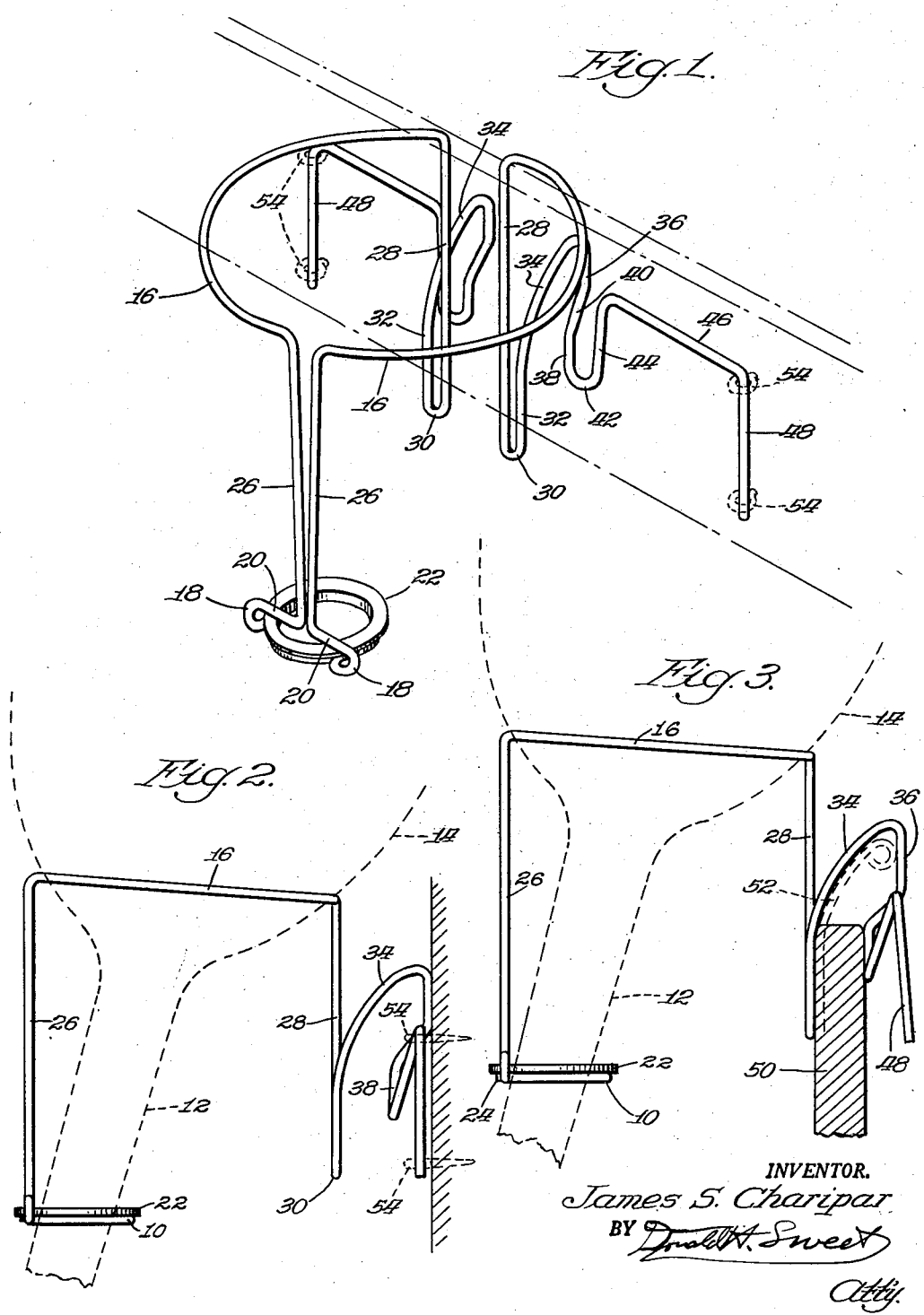
INVENTOR.
James S. Charipar Aug. 19, 1952     J. S. CHARIPAR     2,607,554
SUPPORT
Filed Feb. 13, 1947     2 SHEETS—SHEET 2
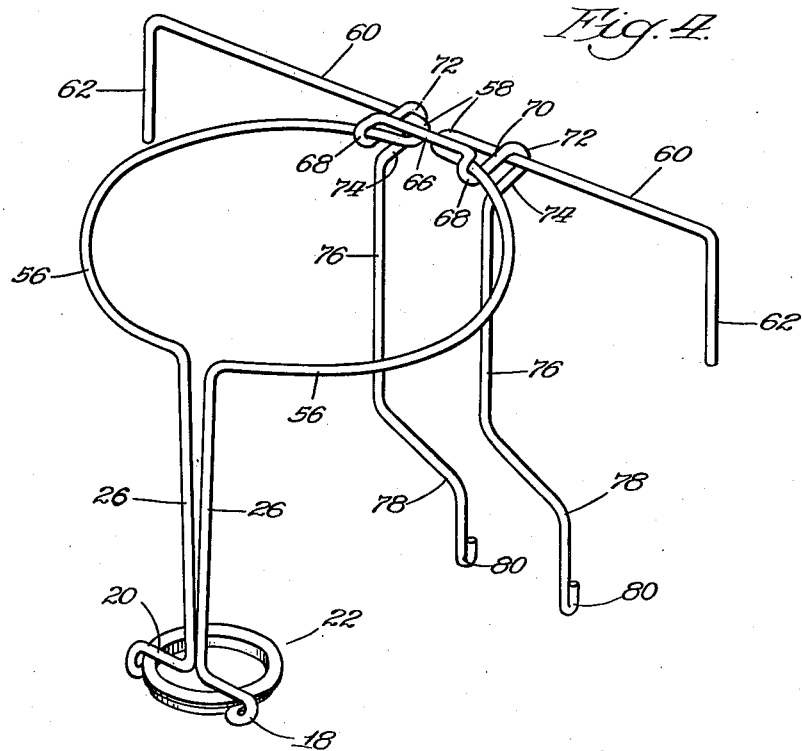
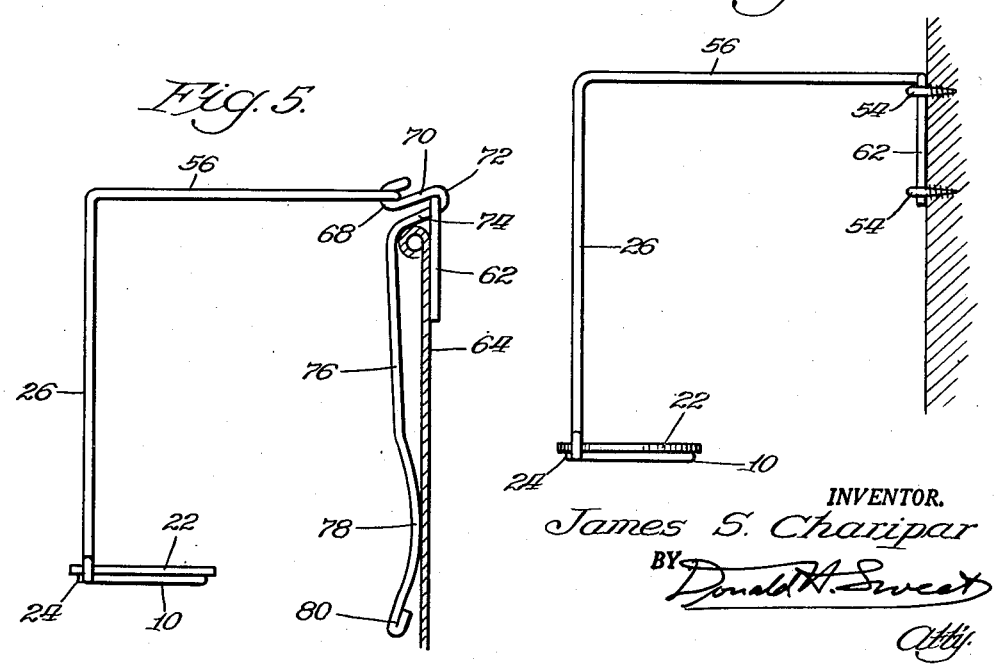
INVENTOR.
James S. Charipar
BY Donald H. Sweet Patented Aug. 19, 1952

2,607,554

UNITED STATES PATENT OFFICE 2,607,554

SUPPORT

James S. Charipar, Chicago, Ill.

Application February 13, 1947, Serial No. 728,235

4 Claims. (Cl. 248—312)

My invention relates to kitchen ware and includes among its objects and advantages increased convenience and avoidance of breakage in connection with preparing coffee in glass equipment.

In the accompanying drawings:

Figure 1 is a perspective view of a device according to the invention;

Figure 2 is a side elevation;

Figure 3 is a similar side elevation with the device supported in a different way;

Figure 4 is a perspective view of a modification;

Figure 5 is a side elevation of the modification of Figure 4, mounted on a panel support;

And Figure 6 is a side elevation of the holder proper of Figure 4 mounted on a support in the nature of a vertical wall.

A common type of coffee maker consists of a glass container of approximately spherical shape with a vertical neck projecting down from the center of the bottom. The main container is substantially filled with water and the dry coffee placed in the cup, with a perforated barrier to hold it from going down the neck. Then the cup is inserted in and supported upon the container and the water is heated. As soon as steam is generated the pressure in the container forces nearly all the water in the container up the neck and into the cup. And when this happens the user turns off the heat. Common instructions are to leave the heat on for approximately a minute before turning it off. The subsequent condensation of the steam in the container generates a vacuum and draws the hot water back through the coffee. This fills the container with coffee ready to serve—except that it is too hot to drink—and the cup may be removed and emptied. Because the cup is defined by surfaces of revolution it tends to roll around in circles on any support on which it is laid and is quite prone to roll off the edge and fall to the floor and be broken. Frequently, at the time the cup is removed from the container, the operator has other immediate duties and does not wish to stop to take the cup elsewhere and empty it.

In the embodiment of the invention selected for illustration in Figures 1 to 3 inclusive, the frame comprises a U-shaped bight 10, adapted to receive the neck 12 of the cup 14. There is also a larger ring, or circular supporting structure including two approximately semi-circular halves, or arcs, 16 facing toward each other and of a size to engage the bottom of the cup, or bowl, above the neck. The wire forming the bight 10 is subsequently bent to form a loop portion 18 at each end of the bight, which loop merges with an inwardly directed horizontal reach 20. The loops 18 are in a vertical plane and define a slot into which a ring or grommet of plastic material can be inserted. The grommet has a radial flange 22 overlying the bight 10 and an axial flange 24 received inside the bight 10. The open end of the bight is curved in just before it joins the loops 18 to a trifle less than the diameter of the flange 24 so that the ring is held in place gently by friction.

The horizontal reaches 20 extend toward each other into close proximity and then are bent approximately at right angles to define risers 26 which diverge slightly upwardly and join the adjacent ends of the arcs 16. The rear ends of the arcs 16 terminate in slightly spaced relationship, the space amounting to about one-fifth or one-fourth of the diameter of the ring defined by the arcs 16. From the inner ends of the arcs 16 the risers 28 extend downwardly. The lower ends of the risers 28 continue in the form of narrow U-shaped bights 30, both aligned in the same plane with the risers 28. The remote legs of the bights 30 include short vertical portions 32 and curved portions 34 curving upwardly and rearwardly with a gradually increasing inclination. The upper ends of the curved portions 34 are turned down to form short vertical reaches 36 and a second pair of short vertical reaches 38 set forward with respect to the reaches 36 by offsets 40. The reaches 38 are continued in the form of wider bights 42, the outer legs 44 of which extend upwardly and diagonally to the rear. The upper ends of the legs 44 are continued in horizontal arms 46 extending away from each other in the same vertical plane, and the outer ends of the arms 46 are turned downwardly to form stakes 48 which, in unstressed condition, extend downwardly and slightly rearwardly, as indicated in Figure 3.

It will be apparent that both legs of both bights 30 cooperate with the reaches 38 to define a vertical slot opening downwardly to receive and grip the upper edge of a supporting panel indicated at 50 in Figure 3. Because the portions 34 have the curvature indicated in the drawings the device can be satisfactorily mounted on solid panels such as 50, of varying thickness over a substantial range, or on sheet metal panels such as the one indicated at 52 in Figure 3, the upper edges of which are curved rearwardly, in which case the reaches 36 may have abutment with the edge of the supporting panel.

When the device is supported as in Figure 3 the arms 46 and stakes 48 have no function, but they are positioned substantially out of sight and entirely out of the way. But in case the user prefers to fasten the device against the kitchen wall above the sink or in any other convenient place where a vertical wall is the most convenient place of attachment, it is a simple matter to put four screw eyes 54 in appropriate position of the supporting structure, as clearly indicated in Figures 1 and 2. Insertion of the stakes 48 in the screw eyes 54 completes the mounting of the device. Such screw eyes may be affixed to a plane support, or in a reentrant angle between two vertical walls to mount the device diagonally in a corner. The rearward inclination of the stakes 48, indicated in Figure 3, can be made just enough so that the device mounted as in Figure 2 will be approximately horizontal. And the resilience of the parts is such that when the glass holder is in place the arcs 16 may bend down a little below the position of Figure 2.

It will be obvious that the user can thrust the neck 12 through the bight 10, but if the user is in a hurry and happens to place the glass holder on the support quickly with the neck sticking down beside the bight 10, the holder will still be safely and properly supported.

Referring now to Figures 4, 5, and 6, the bight 10, loops 18, reaches 20, and risers 26 may be identical with those of Figure 1. The arcs 56 are made a little longer than the arcs 16 and are continued in closely adjacent bights 58 in the same horizontal plane with the arcs, from which bights the arms 60 extend in opposite directions to terminate in the downwardly directed stakes 62. Such a construction will constitute a complete support when mounted on the same screw eyes 54 as in Figures 1 and 2, and such a mounting is illustrated in Figure 6.

To mount such a device on such a support as the panels 50 or 52 of Figure 3 or the panel 64 of Figure 5, I provide an adapter. The adapter includes the center cross reach 66 having rearwardly facing hook shaped portions 68 at both ends. From the portions 68 rearwardly extending reaches 70 terminate in forwardly facing hook portions 72. Beyond the hook portions 72 the ends of the adapter are extended first forwardly and then downwardly, as in the short forward reaches 74, and the long downward reaches 76, ending in curved contact portions 78 with the ends of the wires doubled under at 80. With the adapter assembled with the main holder as in Figure 4 it is only necessary to position the reaches 76 in front of the panel 64 and the stakes 62 behind the panel to secure a complete and effective mounting, as clearly indicated in Figure 5.

Such a combined device is preferably sold assembled as in Figure 4, and if the user prefers to mount it as in Figure 6, it is only necessary to flex the arcs 56 a little and separate the bights 58 far enough to disengage the hooks 68. Thereafter the attachment can be rotated 45° or more in a counterclockwise direction from the position of Figure 5, after which the hooks 72 can be disengaged from the reaches 60 and the attachment is completely free from the holder proper and may be discarded.

Others may readily adapt the invention for use under various conditions of service by employing one or more of the novel features disclosed or equivalents thereof. For instance, it will be obvious that the construction of Figures 1, 2 and 3 could be adapted for mounting on the edge of a horizontal shelf instead of a vertical panel by positioning the risers 28 in the same plane with the arcs 16 and making the bights 42 enough longer to get a good grip on the top of the shelf, either with or without shortening the bights 30. And where service conditions are such that the hooks 68 might be bumped carelessly and injure the bowl, the arcs 56 may be offset to a larger radius from that point to the bights 58, so that the hooks do not project inside the ring.

As at present advised with respect to the apparent scope of my invention, I desire to claim the following subject matter:

1. A support of the class described, comprising, in combination: a resilient ring bifurcated into substantially equal halves; divergent arms extending away from each other and substantially tangent to said ring and rigidly connected to adjacent ends of said halves; said arms lying substantially in the plane of said ring; downwardly extending stakes at the ends of said arms; said stakes being substantially perpendicular to the plane of said ring; and a resilient connection between the adjacent ends of said halves remote from said arms and stakes; said resilient connection including downwardly extending risers substantially perpendicular to the plane of said ring; and a loop materially smaller than said ring connecting the lower ends of said risers and adapted to receive and guide the neck of a coffee holder comprising a bowl of a size to be supported by said ring and a downwardly extending neck connecting to the bottom of said bowl; and a detachable bracing attachment for said holder comprising braces, one for each of said arms; each brace extending from an intermediate point on said arm forwardly and then downwardly to engage the front of a supporting panel positioned in front of said stakes; each brace being continued around said arm to define a hook opening diagonally downward and forward; the upper arm of each hook having an end curved back to define a shorter hook opening diagonally upward and rearward; and a center cross reach interconnecting the ends of said last mentioned hooks; whereby said entire attachment may be formed from a single piece of wire.

2. A support of the class described, comprising, in combination: a resilient ring bifurcated into substantially equal halves; divergent arms extending away from each other and substantially tangent to said ring and rigidly connected to adjacent ends of said halves; said arms lying substantially in the plane of said ring; downwardly extending stakes at the ends of said arms; said stakes being substantially perpendicular to the plane of said ring; and a resilient connection between the adjacent ends of said halves remote from said arms and stakes; and a detachable bracing attachment for said holder comprising braces, one for each of said arms; each brace extending from an intermediate point on said arm forwardly and then downwardly to engage the front of a supporting panel positioned in front of said stakes; each brace being continued around said arm to define a hook opening diagonally downward and forward, the upper arm of each hook having an end curved back to define a shorter hook opening diagonally upward and rearward; and a center cross reach interconnecting the ends of said last mentioned hooks.

3. In a wire support for holding an inverted glass receptacle of the type having a long straight tubular neck and a generally spherical body: opposed arcuate wire contact members shaped to partially encircle opposite hemispheres of said body in a horizontal plane farther from the maximum girth or equator of said body than from its pole and thus to carry the weight of said receptacle; said contact members being symmetrically arranged to define two pairs of adjacent ends in the plane of contact; two integral reaches extending downward in spaced relationship from one pair of adjacent contact member ends; an integral bight joining the lower ends of said reaches; and means connected to the remaining pair of adjacent contact member ends for mounting said support; whereby said reaches constitute a guard for the neck of said receptacle, and also greatly increase the resilience of engagement between said contact members and the inverted receptacle; said integral bight including a loop lying in a horizontal plane of a size to receive said neck and hold it in alignment directly behind said guard; said mounting means including divergent arms extending away from each other and substantially tangent to said ring and rigidly connected to adjacent ends of said halves; said arms lying substantially in the plane of said ring; downwardly extending stakes at the ends of said arms; said stakes being substantially perpendicular to the plane of said ring.

4. In a wire support for holding an inverted glass receptacle of the type having a long, straight, tubular neck and a generally spherical body: opposed arcuate encircling wire members, each shaped to encircle a major portion of one hemisphere of a spherical glass body by contacts therewith in a horizontal plane farther from the maximum girth or horizontal equator of said body than from its pole, and thus to carry the weight of said receptacle; said encircling members being symmetrically arranged in the same horizontal plane, each encircling member comprising a single strand of wire all in the same plane; said encircling members having two pairs of adjacent ends; connections from a first pair of said ends to a supporting structure; two integral risers extending from the second pair of ends remote from any supporting structure, vertically downward in closely spaced relationship; said risers lying in a vertical plane remote from said supporting structure connections, and constituting a guard for the lower hemisphere and neck of the glass receptacle; the lower ends of said risers being united by an integral loop large enough to receive the neck of the glass receptacle; said loop being turned into a horizontal plane spaced below the plane of said contact members by a distance greater than the radius of the spherical body, whereby the weight of said glass receptacle cannot rest on said loop; said loop connection increasing the yieldability of the upper ends of said risers.

JAMES S. CHARIPAR.

REFERENCES CITED

The following references are of record in the file of this patent:

UNITED STATES PATENTS

| Number | Name | Date |
|---|---|---|
| 596,724 | Steppart | Jan. 4, 1898 |
| 1,137,583 | Cox | Apr. 27, 1915 |
| 2,132,056 | Tate | Oct. 4, 1938 |
| 2,187,974 | Johnson | Jan. 23, 1940 |

FOREIGN PATENTS

| Number | Country | Date |
|---|---|---|
| 45,643 | Norway | Jan. 31, 1927 |
| 154,366 | Germany | Sept. 5, 1904 |
| 345,865 | France | Nov. 2, 1904 |